(12) United States Patent
Bosscher et al.

(10) Patent No.: US 10,000,188 B2
(45) Date of Patent: Jun. 19, 2018

(54) ROBOTIC VEHICLE WITH INTEGRATED MOBILITY ENHANCEMENT AND MAST DEPLOYMENT

(71) Applicant: Harris Corporation, Melbourne, FL (US)

(72) Inventors: Paul M. Bosscher, West Melbourne, FL (US); Matthew D. Summer, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 223 days.

(21) Appl. No.: 15/217,214

(22) Filed: Jul. 22, 2016

(65) Prior Publication Data
US 2018/0022324 A1    Jan. 25, 2018

(51) Int. Cl.
| | |
|---|---|
| *B62D 55/06* | (2006.01) |
| *B60S 9/02* | (2006.01) |
| *G05D 1/02* | (2006.01) |
| *B62D 55/075* | (2006.01) |

(52) U.S. Cl.
CPC ............. *B60S 9/02* (2013.01); *B62D 55/06* (2013.01); *G05D 1/0276* (2013.01); *B62D 55/075* (2013.01)

(58) Field of Classification Search
CPC ............................. B60S 9/02; B62D 55/075
USPC .......................................... 180/7.1, 8.2, 8.7
See application file for complete search history.

(56) References Cited

U.S. PATENT DOCUMENTS

| | | | | |
|---|---|---|---|---|
| 5,884,718 | A * | 3/1999 | Yamashiro | B62D 51/007 180/9.32 |
| 7,475,745 | B1 * | 1/2009 | DeRoos | B62D 55/02 180/8.1 |
| 8,800,695 | B2 | 8/2014 | Couture et al. | |
| 9,096,281 | B1 * | 8/2015 | Li | B62D 55/02 |
| 9,623,715 | B1 * | 4/2017 | Morey | B60G 17/016 |
| 2008/0179115 | A1 * | 7/2008 | Ohm | B25J 5/005 180/9.21 |
| 2010/0139995 | A1 * | 6/2010 | Rudakevych | B62D 55/06 180/9.32 |
| 2012/0200149 | A1 | 8/2012 | Rudakevych et al. | |
| 2013/0231779 | A1 * | 9/2013 | Purkayastha | B25J 9/1697 700/259 |
| 2014/0031977 | A1 * | 1/2014 | Goldenberg | B25J 9/08 700/245 |
| 2014/0110183 | A1 * | 4/2014 | Rudakevych | B60K 7/0007 180/9.32 |

OTHER PUBLICATIONS

Search Report dated Sep. 26, 2017 for GB1711330.9.

* cited by examiner

*Primary Examiner* — Tony H Winner
(74) *Attorney, Agent, or Firm* — Fox Rothschild LLP; Robert J. Sacco; Carol E. Thorstad-Forsyth

(57) ABSTRACT

An unmanned ground vehicle (UGV) includes a mast attached to a UGV body at a base end. The mast extends a predetermined distance to a mast head which can include a mast-head device. A flipper assembly includes at least one flipper arm which is rotatably mounted to the UGV body to help facilitate UGV stability and/or mobility. A flipper actuator causes the flipper arm to rotate about a flipper rotation axis. Movement of the mast between a stowed configuration and a deployed configuration is selectively controlled by operation of the flipper assembly.

19 Claims, 7 Drawing Sheets

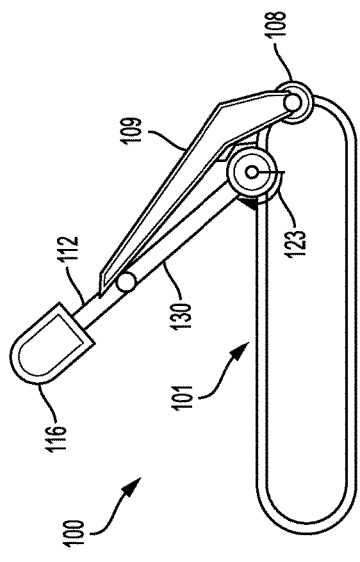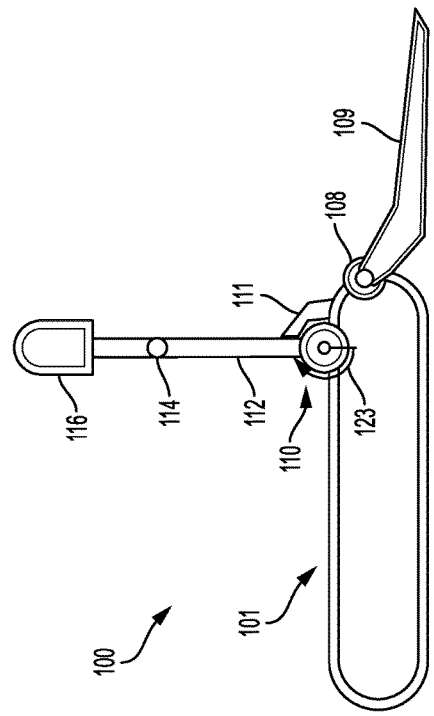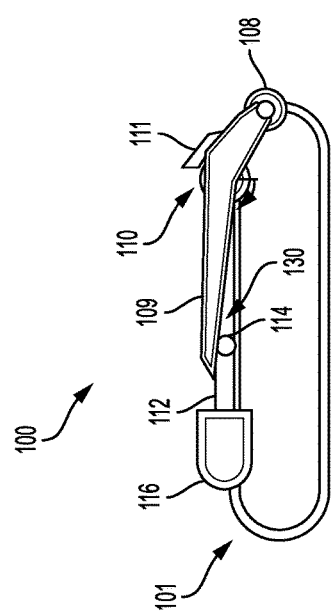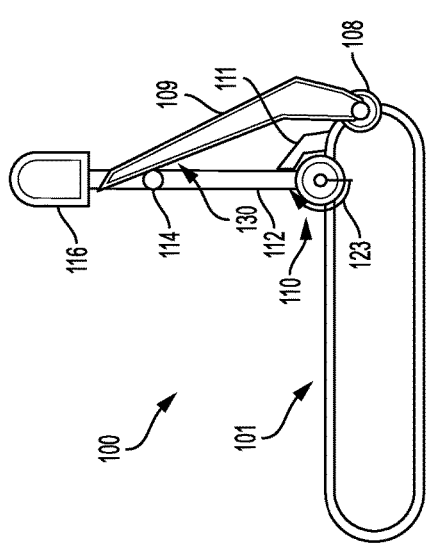

ROBOTIC VEHICLE WITH INTEGRATED MOBILITY ENHANCEMENT AND MAST DEPLOYMENT

BACKGROUND OF THE INVENTION

Statement of the Technical Field

This document relates generally to Unmanned Ground Vehicles ("UGVs"). More particularly, this document relates to UGVs with enhanced features and reduced cost.

Description of the Related Art

UGVs are motorized ground vehicles that operate without an on-board human presence. Remotely-controlled and remotely-guided unmanned vehicles (such as UGVs) are in widespread use in applications such as Explosive Ordinance Disposal ("EOD"), search and rescue operations, hazardous material disposal, surveillance, etc. A conventional UGV includes a chassis, wheels, drive motors mounted on the chassis, an articulating arm mounted on top of the chassis, and grippers mounted on the arm. UGVs can also be equipped with an imaging device, such as a video camera, which may be mounted on the articulating arm. In some scenarios, an imaging device and/or other functional component can be disposed on a mast which extends upwardly from the chassis. Some UGVs include tracks that facilitate operation over rough terrain. Steering of tracked UGVs can be effectuated by simultaneously operating the wheels or tracks on opposite sides of the UGV.

Movement and steering of a UGV can be controlled by a user at a location remote from the UGV using a joystick-equipped control unit. The control unit communicates with the UGV by way of a wireless communication link. The control unit may also be used to remotely control the UGV's robotic arm and gripper. Movement of the UGV is typically controlled by modulating the velocity of the UGV in proportion to the displacement of the joystick of the control unit.

UGVs are often used to in sloped and inclined areas (e.g., stairs, hills, slopes, rubble, etc.). In these scenarios, the UGVs can require certain enhancements to improve stability and/or mobility. For example, motorized flipper arms can be used for this purpose. The motorized flipper arms can be remotely controlled using the control unit.

SUMMARY OF THE INVENTION

Embodiments of the invention concern a UGV in which a mast which is attached to a UGV body at a mast base end. The mast extends a predetermined distance to a mast head on which is mounted at least one mast-head device, such as an imaging device. A flipper assembly includes at least one flipper arm which is rotatably mounted to the UGV body to help facilitate UGV stability and/or mobility. The flipper arm is responsive to a flipper actuator which is configured to cause the flipper arm to rotate about a flipper rotation axis. According to one aspect, movement of the mast between a stowed configuration and a deployed configuration is selectively controlled by operation of the flipper assembly.

A pivot coupling can be provided at the base end of the mast to facilitate a pivot of the mast about a pivot axis. A resilient member is arranged to resiliently bias the mast so as to urge a rotation of the mast about the pivot axis. The resilient member urges the mast to rotate from the stowed position where the mast-head is disposed a first distance from the UGV body, to a deployed position in which the mast-head is disposed at a second distance from the UGV body. The flipper arm has a bearing surface which is arranged to engage a coupler portion of the mast during rotation of the mast about the pivot axis. Consequently, a rotation of the flipper arm in a deployment direction by a flipper actuator controls a position and an angular rate of rotation of the mast as it pivots toward a deployed position. A bump-stop member is arranged to limit a maximum angular rotation of the mast about the pivot axis when the mast is in a fully deployed position. The mast-head can be disposed at its maximum elevation above the UGV body when the mast is in the fully deployed position.

Further, the flipper actuator is selectively operable to continue rotation of the flipper arm in the deployment direction after the mast is in the fully deployed position. Accordingly, the flipper arm can be rotated in the deployment direction to extend away from the UGV body for engaging a terrain to enhance stability or mobility of the UGV. According to one aspect, the mast is a multi-link structure which is configured to maintain a fixed orientation of the mast head relative to the UGV body as the mast is rotated from its stowed position to its deployed position.

Aspects of the invention also concern a method for controlling a mast elevation in an unmanned ground vehicle (UGV). The method involves pivotally mounting a mast at a mast base end to a UGV body to facilitate rotation of the mast about a pivot axis and vary an elevation of a mast head device relative to the UGV body. The method further involves rotatably mounting at least one flipper arm to the UGV body to facilitate at least one of UGV stability and mobility. Thereafter, a flipper actuator motor is used to cause the at least one flipper arm to rotate about a flipper rotation axis. A rotation of the mast about the pivot axis is selectively controlled by using the at least one flipper arm to engage the mast.

BRIEF DESCRIPTION OF THE DRAWINGS

Embodiments will be described with reference to the following drawing figures, in which like numerals represent like items throughout the figures, and in which:

FIGS. 3A-3D are a series of drawings which are useful for understanding how flipper assembly can be used to control a mast position.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

UGVs are being used for increasingly complex and varied tasks. Further, a single UGV may be called upon to perform a wide variety of tasks in varied environments. So a UGV will advantageously be designed so that it is capable of carrying out a wide variety of missions to accomplish different goals. The UGV must also be designed to facilitate operation in widely varying environments and terrains. These design goals can require a UGV to have a high degree of capability with regard to mobility, manipulation, sensing/inspection and autonomy.

However, implementation of such varied functionality tends to result in substantial cost and complexity. The UGV ends up with many moving parts, such as the manipulator arm, gripper, and flipper assembly (to facilitate stair climbing and obstacle crossing). A mast provided in a UGV may be fixed in place or manually deployed. But in some scenarios it can be desirable for a mast to remain stowed during certain portions of a mission and deployed during other portions of the mission. This can involve additional moving parts, including motors and/or actuators to deploy the mast. Further actuators and/or moving parts can be required to vary a length of a mast so that a height of a camera or other functional component above the vehicle can be raised or lowered in response to commands from the control unit. All of the moving parts, actuators and control circuitry required to implement all of these functions increase UGV cost and complexity. They can also add weight, increase the power consumption, and the number of potential failure points.

Figure 1:
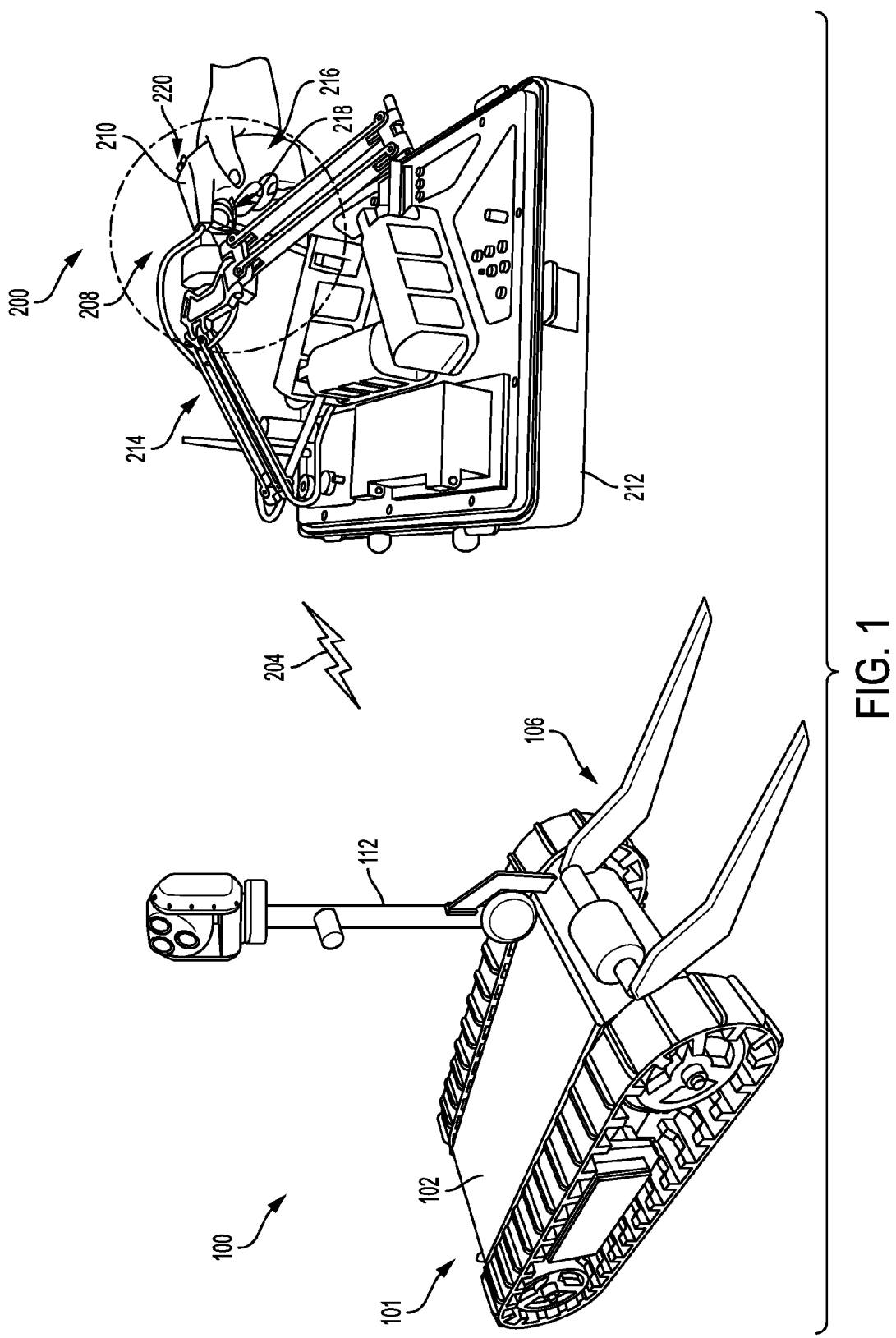
FIG. 1 is a perspective view of a UGV and a control unit.

To overcome these limitations, a UGV is disclosed herein which combines elements of vehicle stability/mobility with a mast (e.g., a camera mast) deployment function. Referring now to FIG. 1 there is provided a schematic illustration of an exemplary UGV 100 and an associated control unit 200 which together comprise a UGV system. The UGV 100 and control unit 200 are not drawn to scale. For example, the UGV 100 can be significantly larger than the control unit 200. However, FIG. 1 is sufficient for understanding the relationship between the two components.

The UGV 100 is a motorized vehicle that operates without an on-board human presence. The UGV 100 can be used in various applications, such as EOD applications, search and rescue applications, hazardous material disposal applications, and/or surveillance applications. The UGV 100 can be remotely controlled using the control unit 200. In this regard, the control unit 200 enables a user's control of the UGV's operations and movement from a remote location.

The embodiment UGV 100 includes a body 101 comprising a rigid chassis 102. A flipper assembly 106 is disposed on the rigid chassis 102. The flipper assembly is comprised of an output shaft 107, flipper actuator 108 and one or more flipper arms 109. The flipper actuator 108 can be a motor (e.g., a reversible pneumatic or electric motor). The output shaft can be formed of a rigid material such as lightweight alloy, polymer or composite. The output shaft is coupled to the flipper actuator 108 so activation of the flipper actuator in a first mode causes output shaft 107 to rotate in a first direction, and activation of the flipper actuator in a second mode causes the output shaft 107 to rotate in an opposing second direction. The first and second directions are indicated by arrow 115 in FIG. 2.

Two flipper arms 109 are provided in the embodiment shown, but it should be understood that more or fewer flipper arms 109 can be included. Also, it should be appreciated that the flipper assembly 106 can include additional structure (e.g. struts, bracing or mesh extending between the flipper arms 109) to provide additional structural rigidity or perform other functions associated with the flipper assembly. In an embodiment shown in FIGS. 1-3, the flipper arms 109 comprise elongated rigid members. The flipper arms are formed of a suitable material such as a lightweight metal alloy, polymer or composite. A first end 117 of each flipper arm is fixed to the output shaft 107 as shown. An elongated length of each flipper arm 109 extends transversely to a rotation axis 113 defined by the output shaft. Accordingly, each flipper arm 109 will rotate about the rotation axis 113 when the output shaft 107 is rotated by the flipper actuator 108. For example, the flipper arms can be configured to rotate at least about 180° as shown in FIG. 3.

Flipper arms can extend various lengths from a rotation axis 113. However, a certain minimum length is generally understood to be necessary in order to facilitate the mobility and stability functions anticipated for the flipper assembly. The actual length of the flipper arm that is needed to carry out such functions will depend to some extent on the location of rotation axis 113, and the geometry, weight distributions and dimensions of the UGV body, and the type of terrain to be traversed. Still, it is anticipated that a flipper arm 109 as described herein will generally extend a minimum distance "d" from a rotation axis, where d is at least about ¼ to ½ of the total length of the vehicle from rear end 122 to front end 120. Of course, the invention is not limited in this regard and other flipper lengths are also possible.

The flipper assembly 106 is advantageously arranged to facilitate UGV stability and mobility over varying terrain. For example, the flipper assembly can be used to help the UGV maneuver over stairs, hills, slopes, rubble, and so on. The use of a flipper assembly with a UGV for such purpose is well known in the art and therefore will not be described here in detail. To facilitate these maneuvers a rotational axis 113 of a flipper arm can be disposed at a location which is at or near a rear end 122 of the UGV body 101. Still, the invention is not limited in this regard and a flipper assembly can also be configured so that the rotational axis 113 is disposed at other locations along the length of the UGV body. For example, in some scenarios, it may be advantageous to arrange the flipper assembly so that the rotational axis 113 is disposed at a front end 120 of the UGV body 101. Also, there may be some scenarios in which the rotational axis 113 is disposed intermediate of the front and rear ends 120, 122 of the UGV body 101.

Figure 2:
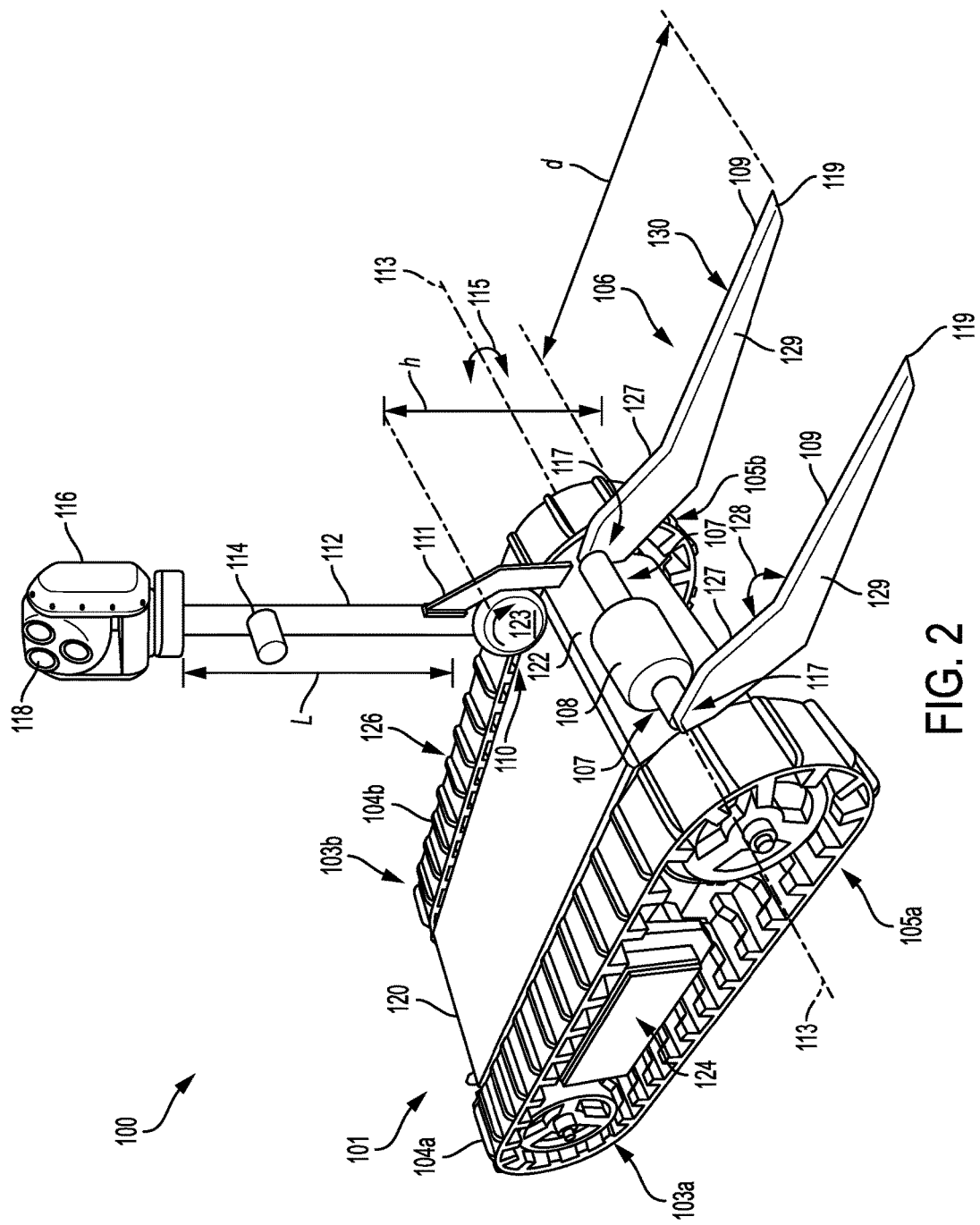
FIG. 2 is an enlarged view showing details of the UGV in FIG. 1.

From the foregoing discussion, it will be appreciated that a flipper arm 109 is an elongated rigid member. In some embodiments, the flipper arms 109 can have a configuration which tapers from a wider first end 117 to an opposing second end 119. Also, the flipper arms 109 can be arranged so that a proximal portion 127 closest to the first end 117 extends in a first extension direction which defines an obtuse angle 128 with a second extension direction defined by a distal portion 119 of the flipper arm which is closest to the second end 119. In some embodiments, the flipper arm can be a simple rigid member as shown in FIGS. 1-3, but it should also be appreciated that flipper arms as contemplated herein can have more complex designs. For example, it is contemplated that a flipper 109 can comprise a motorized actuator which is used to drive a track similar to tracks 104a, 104b. As is known, such a tracked flipper can help facilitate UGV mobility. Still, the exact arrangement of the flipper arms 109 is not critical provided that at least one of the flipper arms is configured for and capable of carrying out certain mast deployment functions as hereinafter described.

A mast 112 is mounted to the rigid chassis 102. For example, the mast can be advantageously located at a position adjacent to the rear end 122 as shown in FIG. 2. According to one aspect, the mast 112 is coupled to the rigid chassis 102 by means of a resilient member 110. The resilient member 110 is configured to resiliently bias the mast 112 toward a direction indicated by arrow 123 so that the mast is urged to rest against a bump stop 111 which is secured to the rigid chassis 102. Examples of resilient members that can potentially be used for this purpose can include a clock spring, a coil spring, and an elastic band.

As shown in FIG. 2, an elongated length of the mast 112 extends from a base end where it is secured to the rigid chassis 102 to a mast head 116 on an opposing end of the mast. The mast 112 has an elongated length L that is intended to extend substantially above the rigid chassis 102. For example, in some embodiments the mast can extend a distance L which is between 2 h-10 h, where h is the height above ground of a base end of the mast where it attaches to the chassis. In some embodiments, the mast 112 can be of a telescoping or extendable configuration so that its length L may be varied. A mast head device 118 is mounted on the mast head 116. The mast head device can be any device which is useful or desirable to position on a mast head 116. For example, the mast head device 118 can be an imaging device (such as a video camera) an antenna, an optical link, or a sensor. The elongated length of the mast is intended to provide the mast head device 118 with a greater field of view or improved line of sight around the UGV 100 (as compared to a different mounting position disposed on the rigid chassis).

As shown in FIG. 2, the UGV 100 also includes movable elements in the form of two front wheels 103a, 103b, two rear wheels 105a, 105b and tracks 104a, 104b. The front wheels 103a, 103b are mounted proximate front-end 120 of the rigid chassis 102 on opposite sides thereof. Only a single one of the front wheels 103a is shown in FIG. 2, but it will be understood that the second front wheel 103b is comprised of a similar arrangement mounted to an opposing side of the vehicle. The rear wheels 105a, 105b are mounted proximate the rear end 122 of the rigid chassis 102 on opposite sides thereof. Only a single one of the rear wheels 105 is clearly visible in FIG. 2, but it will be understood that the second rear wheel 105b is mounted to an opposing side of the vehicle and is comprised of a similar arrangement. In alternative embodiments, the movable elements can be structures other than wheels, such as articulating legs.

The UGV 100 further comprises actuating devices in the form of two or more variable-speed, reversible electric motors. The motors are mounted on the body 101. A first one of the motors 124 is coupled to the rear wheel 105a on a first side of the vehicle so that activation of the motor causes the rear wheel 105a on that side to rotate. A second one of the motors 126 is coupled to the rear wheel 105b on an opposing side of the vehicle so that activation of the motor 126 causes the rear wheel 105b on the opposing side of the vehicle to rotate. Additional motors (not shown) can be employed for directly driving the front wheels 103. The front wheel and the rear wheel on each side of the vehicle are respectively coupled by way of a tread or track 104a, 104b. Rotation of the rear wheel drives a respective one of the tracks 104a, 104b, which in turn causes the front wheel on each side to rotate.

Referring now to FIGS. 3A-3D an actuator 108 for a flipper arm 109 can be used advantageously to perform a dual function so as to also control deployment and stowage of a mast 112. FIG. 3A shows a configuration in which a flipper arm 109 and a mast 112 are both in a stowed configuration whereby an elongated portion of each element is folded over to extend in alignment with the length or width of a UGV body 101. The flipper arm 109 is rotated to this position by operation of flipper actuator 108 as described in relation to FIG. 2. The mast 112 is resiliently biased by resilient member 110 in direction 123, toward its upright position shown in FIG. 2. But in FIG. 3A, it can be observed that a bearing surface 130 of flipper arm 109 has engaged a portion of an engagement structure associated with the mast. In this embodiment the engagement structure is a coupling rod 114 but it will be appreciated that other engagement structures are also possible. The rotation of the flipper arm to its stowed position as shown results in a dual function operation wherein the mast 112 is caused to fold or rotate to its stowed configuration as shown. The mast will be maintained in this stowed configuration for so long as the flipper arm is also stowed.

When it is time for the mast 112 to be deployed, the flipper arm 109 is rotated as shown in FIGS. 3B and 3C. Since the mast 112 is resiliently biased in direction 123, this rotation of the flipper arm 109 will simultaneously allow the mast 112 to rotate to its partially deployed configuration shown in FIG. 3B and then to its fully deployed configuration in FIG. 3C, where its further rotation is interrupted by bump stop 111. As shown in FIG. 3C, the mast 112 in its fully deployed configuration is substantially vertical for achieving its maximum height above the surrounding terrain. If the flipper assembly is not needed for stability/mobility enhancement then the flipper assembly can remain in the partially stowed position shown in FIG. 3C for the duration of the mast deployment. The flipper arm is in a substantially vertical orientation in FIG. 3C so it is less likely to interfere with UGV mobility operations.

In the event that the flipper arm 109 is needed to enhance stability/mobility operations of the UGV 100, it can be rotated further (e.g. to the position shown in FIG. 3D) or dynamically moved to varying positions to perform conventional flipper functions which facilitate mobility and stability of the UGV over varying terrains. Such conventional flipper operations are known and therefore will not be described here in detail.

Figure 4:
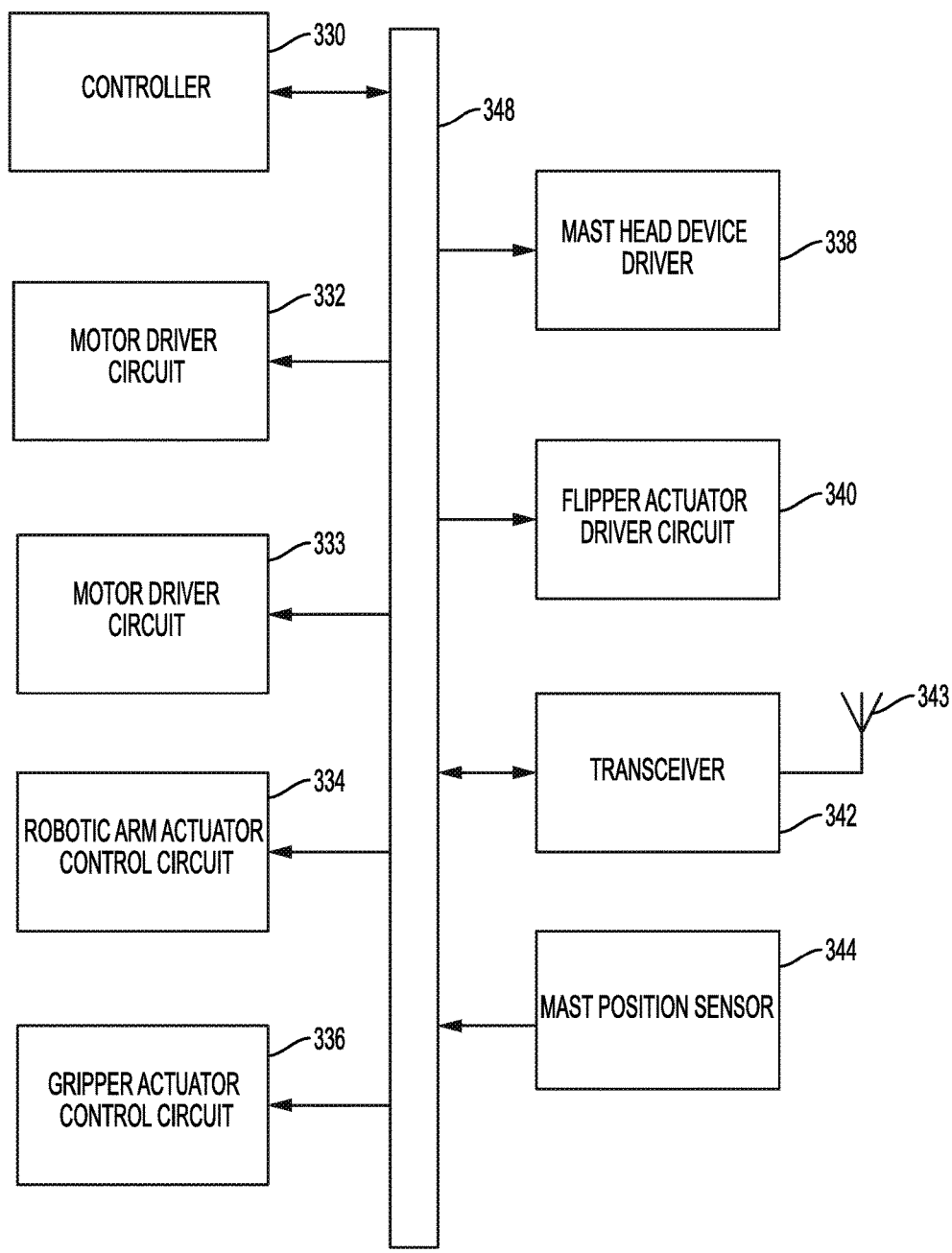
FIG. 4 is a block diagram that is useful for understanding certain details of a UGV.

Referring now to FIG. 4 there is shown a block diagram of an embodiment UGV 100 which is useful for understanding certain features thereof. The UGV 100 can include a controller 330, motor driver circuits 332, 333 (e.g., for controlling motors 124, 126), a robotic arm actuator control circuit 334 for controlling a robotic manipulator arm (not shown), a gripper actuator control circuit 336 for controlling a gripper (not shown) which may be disposed on the robotic manipulator arm, a mast head device driver circuit 338 for interfacing, communicating and/or controlling a mast head device 118, a flipper actuator driver circuit 340 for controlling flipper actuator 108, a radio transceiver 342 coupled to antenna 343 for effecting a wireless bidirectional communication link with a control unit 200, and a mast position sensor 344 to detect a mast deployment position. A digital data bus 348 is provided to facilitate communication of data and control signals among the devices shown in FIG. 4.

Figure 5:
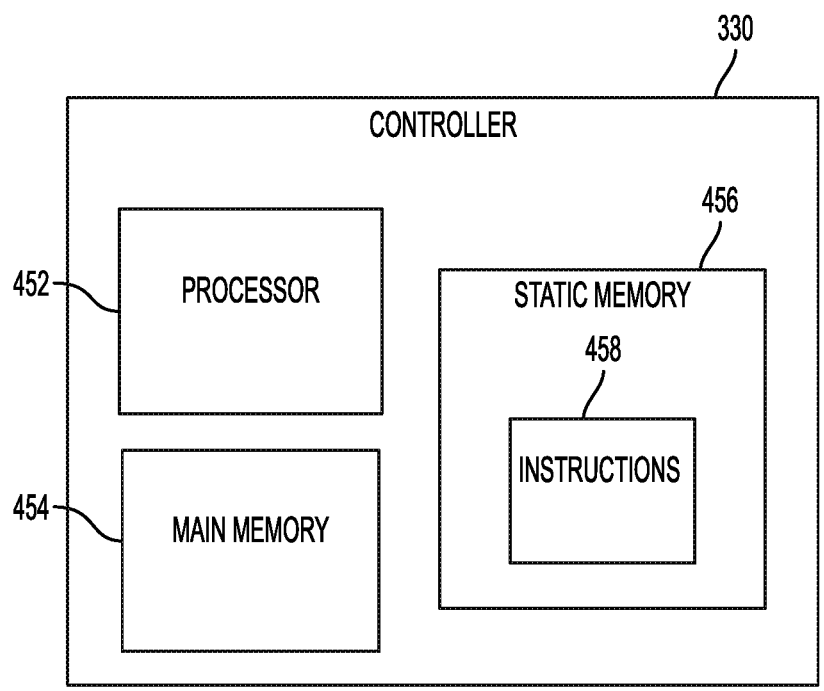
FIG. 5 is a block diagram that is useful for understanding a controller which can be used in a UGV.

As shown in FIG. 5, the controller 330 can comprise a processor 452 (e.g., a Central Processing Unit ("CPU")), a main memory 454 and a static memory 456. These electronic components 452, 454, 456 can communicate with each other via the data bus 348 or other suitable means. The static memory 456 stores one or more sets of instructions 458 (e.g., software code). The instructions 458 implement one or more of the methodologies, procedures, or functions described herein. The instructions 458 can also reside, completely or at least partially, within the main memory 454 or the processor 452 during execution thereof thereby.

Referring once again to FIG. 1, the control unit 200 further comprises an input device 208. In some scenarios, the input device 208 comprises a joystick to command the vehicle's movement. In other scenarios, the input device 208 comprises a hand grip 210 movably coupled to a base 212 via a plurality of linkages 214. The hand grip 210 includes a body 216 and a trigger 218. The body 216 is sized and shaped to be grasped by the hand of an operator. The trigger 218 is movable between a rest position and a fully depressed position. In this regard, the trigger 218 is mounted on the body 216 so that the user can pull or depress the trigger using his or her index finger while grasping the hand grip 210. Buttons 220 are disposed on the hand grip 210 for providing a means to control various operational features of the UGV 100.

Figure 6:
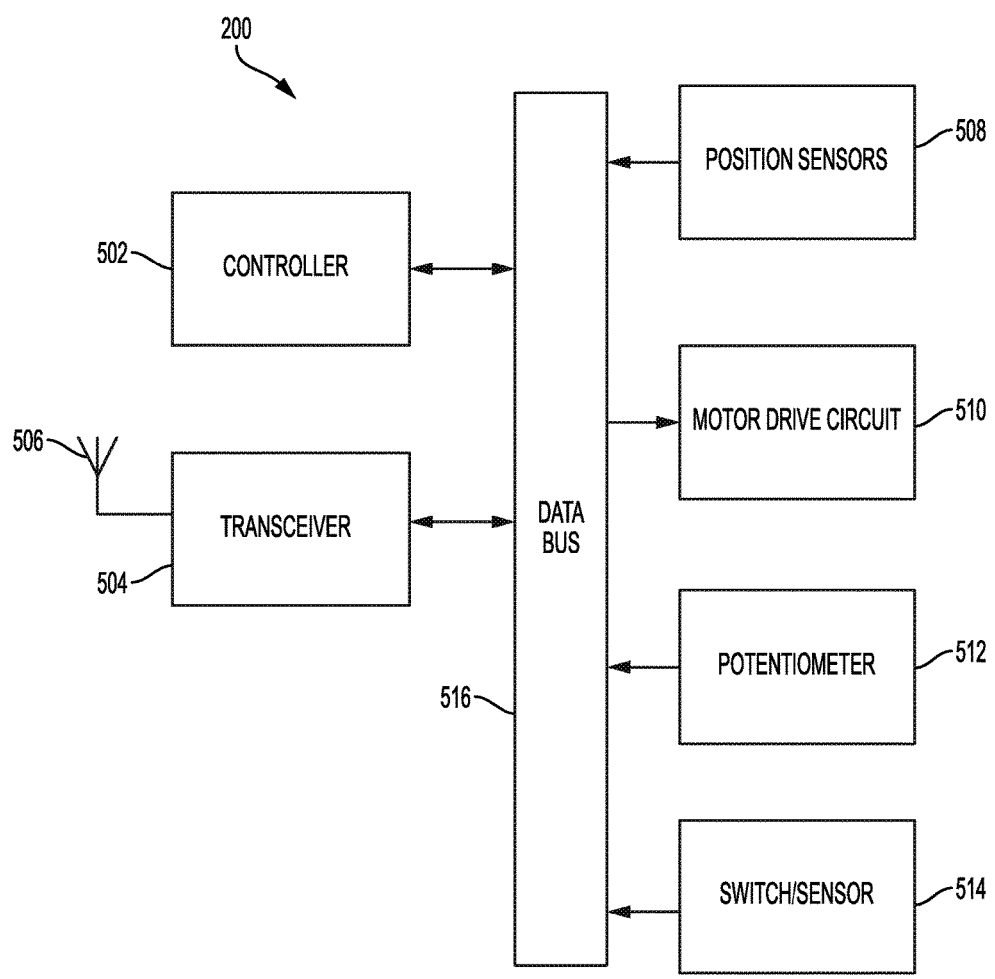
FIG. 6. is a block diagram that is useful for understanding certain details of a UGV control unit.

Referring now to FIG. 6, the control unit 200 comprises a controller 502 which is responsive to input signals received from the input device 208 for controlling the operation of the UGV 100. The controller 502 can be similar to or the same as the controller 330 of the UGV. As such, the controller 330 may include a processor circuit (not shown) and memory (not shown) housed in a rigid casing (such as base 212). Instructions (not shown) may be stored in the memory. The instructions can be implemented as software code configured to implement one or more of the methodologies, procedures, or functions described herein.

The control unit 200 also includes various other features to carry out UGV control functions. For example, a wireless transceiver 504 is communicatively coupled to the controller 502. The transceiver 504 is configured to communicate with the transceiver 342 of the UGV 100 via an RF communication link 204. An antenna 506 is provided to facilitate the transmission and reception of RF signals to and from the transceiver 504. Position sensors 508 can be provided in association with the various linkages 214 to detect a position and orientation of the input device 208. Optional motors 510 can be provided to facilitate haptic feedback to the user through the input device 208, a potentiometer 512 or other suitable position sensing device can be used to detect a position of trigger 218. Switches 514 can be provided which are responsive to the operations of buttons 220 on the input device. A data bus 516 facilitates communications among the various components.

Figure 7A:
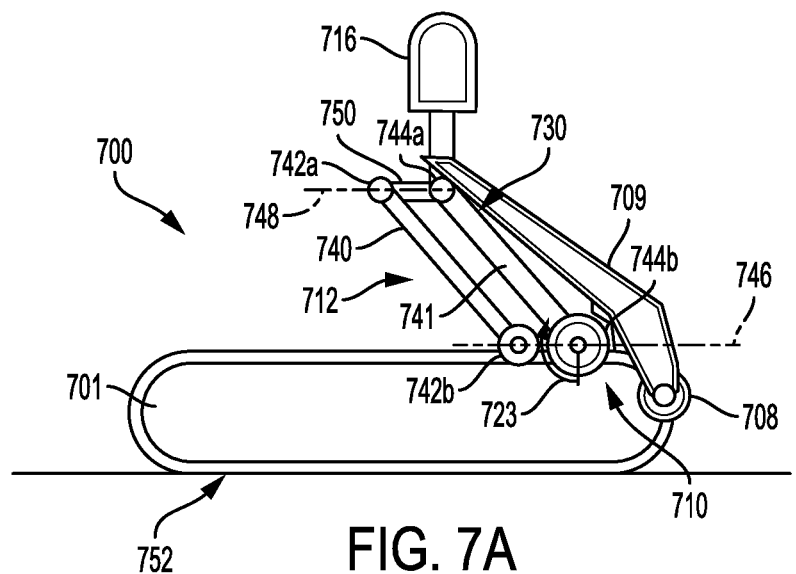
FIGS. 7A and 7B are a set of drawings that are useful for understanding a manner in which a multi-link mast can be used to maintain an orientation of a mast head as the mast is raised from a stowed position to a deployed position.
Figure 7B:
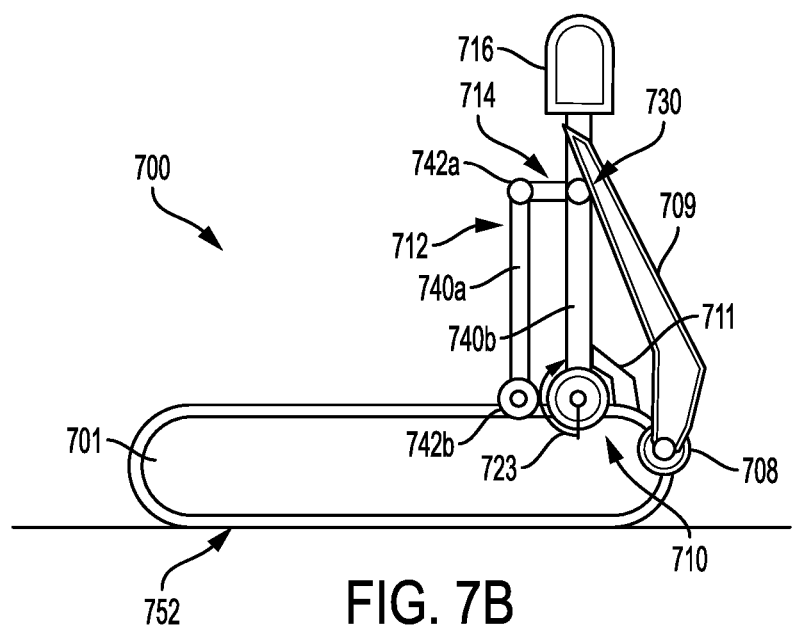

It should be appreciated that embodiments can include various other mast configurations which interact with flippers in various ways to facilitate the dual function flipper operation as described herein. All such mast configurations and arrangements for using a flipper arm to control a mast position, whether now known or known in the future, are intended to be included within the scope of the invention. For example, FIGS. 7A and 7B show an alternative multi-link mast configuration for a UGV 700. The UGV 700 is similar to UGV 100 and includes a flipper assembly comprising a flipper arm 709. The flipper arm is rotatable in response to the operation of a motorized actuator 708 in a manner similar to that described herein with respect to UGV 100. The UGV 700 includes a mast head 716 disposed on mast 712. The mast 712 is resiliently biased by resilient member 710 in direction 723, toward its upright position shown in FIG. 7B. Also, the movement of the mast 712 from a stowed configuration to an upright configuration is controlled by the motion of the flipper arms 709 in a manner similar to that described in relation to the UGV shown in FIGS. 3A-3D.

But unlike the mast 112 of UGV 100 shown in FIGS. 2 and 3A-3D, the mast 712 of a UGV 700 can have a multi-link configuration. For example, in the exemplary embodiment shown in FIGS. 7A and 7B a pair of parallel links 740, 741 are provided. The parallel links are elongated rigid members of substantially the same length which have pivot couplings 742a, 742b, 744a, 744b disposed on opposing ends thereof. A pivot axis of pivot coupling 742b and pivot coupling 744b are both orthogonal to the page in FIG. 7 and orthogonally aligned with line 746. Likewise, a pivot axis of pivot coupling 742a and pivot coupling 744a are both orthogonal to the page in FIG. 7 and orthogonally aligned with line 748. Lines 746 and 748 are substantially parallel and the pivot couplings can be arranged so that pivot couplings 742a, 744a pivot in a plane that is parallel to pivot couplings 742b, 744b as the mast 712 transitions through its full range of motion. Further, lines 746, 748 can be generally aligned with a plane defined by ground engagement surface 752 of UGV 700. Consequently, the master link 750 remains parallel to the plane defined by the ground engagement surface as the mast 712 is raised and lowered throughout its entire range of motion. An advantage of this approach is that the mast head 716 can be raised and lowered without changing an orientation of the one or more functional devices which are present therein. For example, if an imaging device is disposed in the mast head 716, its orientation relative to the surface on which the UGV 700 is disposed will not change as the mast 712 is raised and lowered.

In FIG. 7B, the mast 712 is shown fully raised to its upright position. In FIG. 7A, a mast 712 of the UGV is shown partly lowered toward its fully stowed configuration. In a fully stowed configuration (which is not shown), the flipper arms 709 would be rotated by motorized actuator 708 toward the upper surface of body 701 in a manner similar to that shown in FIG. 3A. This motion of the flipper arms 709 will cause the parallel links 740, 741 to pivot toward the UGV body 701 so that an elongated length of the parallel links 740, 741 is substantially parallel to the master link 750. In this configuration, the parallel links will extend in a direction which is generally parallel to the plane defined by ground engagement surface 752.

In other respects, the operation of mast 712 is similar to the mast 112 described with respect to FIGS. 3A-3B. Resilient member 710 urges mast 712 to pivot in a direction 723. Bearing surface 730 of the flipper arm 709 slidably engages against a guide surface defined by coupling rod 714 to control the motion of the mast as it deploys from its stowed configuration to its fully deployed configuration shown in FIG. 7B. A motion of the mast 714 is arrested by a bump stop 711 when the mast is fully deployed. A sufficient force applied by the bearing surface 730 urges the mast 714 back toward its stowed configuration when the mast 714 and flipper arm 709 are not needed for UGV operations. Of course, other mast mechanisms and linkages are also possible to facilitate raising and lowering the mast in response to a force applied by the flipper arms. All such mast mechanisms and linkages are intended to be included within the scope of the invention.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

We claim:

1. An unmanned ground vehicle (UGV) comprising:
   a UGV body comprising a rigid chassis;
   a drive system arranged to facilitate travel of the UGV body over a ground surface;
   a mast attached to the UGV body at a base end, the mast extending a predetermined distance to a mast head on which is mounted at least one mast-head device configured for performing a predetermined function; and
   a flipper assembly configured to facilitate at least one of UGV stability and mobility, the flipper assembly comprised of at least one flipper arm rotatably mounted to the UGV body and at least one flipper actuator arranged to cause the at least one flipper arm to rotate about a flipper rotation axis responsive to a control signal;
   wherein a movement of the mast between a stowed position and a deployed position different from the stowed position is selectively controlled by operation of the flipper assembly.

2. The UGV according to claim 1, wherein a pivot coupling is provided at the base end of the mast to facilitate a pivot of the mast about a pivot axis, and a resilient member is arranged to resiliently bias the mast so as to urge a rotation of the mast about the pivot axis.

3. The UGV according to claim 2, wherein the rotation urged by the resilient member is from the stowed position wherein the mast-head is disposed a first distance from the UGV body, to a deployed position in which the mast-head is disposed at a second distance from the UGV body, and wherein the second distance is greater than the first distance.

4. The UGV according to claim 3, wherein the at least one flipper arm comprises a bearing surface which is arranged to engage a coupler portion of the mast during said rotation of the mast about the pivot axis.

5. The UGV according to claim 4, wherein a rotation of the at least one flipper arm in a deployment direction controls an angular rate of rotation of the mast as the mast pivots toward the deployed position.

6. The UGV according to claim 5, further comprising a bump-stop member which is arranged to limit a maximum angular rotation of the mast about the pivot axis when the mast is in a fully deployed position.

7. The UGV according to claim 6, wherein the mast-head is disposed at its maximum elevation above the UGV body when the mast is in the fully deployed position.

8. The UGV according to claim 6, wherein the flipper actuator is selectively operable to continue rotation of the at least one flipper arm in the deployment direction after the mast is in the fully deployed position.

9. The UGV according to claim 8, wherein the at least one flipper arm is rotatable in the deployment direction to extend away from the UGV body for engaging a terrain to enhance stability or mobility of the UGV.

10. The UGV according to claim 1, wherein the mast is a multi-link structure which is configured to maintain a fixed orientation of the mast head relative to the UGV body as the mast is rotated from its stowed position to its deployed position.

11. A method for controlling a mast elevation in an unmanned ground vehicle (UGV) comprising:
    pivotally mounting a mast at a base end to a UGV body to facilitate rotation of the mast about a pivot axis and variation of an elevation of a mast head device relative to the UGV body;
    rotatably mounting at least one flipper arm to the UGV body to facilitate at least one of UGV stability and mobility;
    using a flipper actuator motor to cause the at least one flipper arm to rotate about a flipper rotation axis;
    selectively controlling a rotation of the mast about the pivot axis by using the at least one flipper arm.

12. The method according to claim 11, further comprising resiliently biasing the mast to urge a rotation of the mast about the pivot axis.

13. The method according to claim 12, further comprising using the resilient member to urge said mast to rotate from a stowed position wherein the mast-head is disposed a first distance from the UGV body, to a deployed position in which the mast-head is disposed at a second distance from the UGV body, the second distance different as compared to the first distance.

14. The method according to claim 13, further comprising controlling the rotation of the mast by using a bearing surface of the at least one flipper arm to engage a coupler portion of the mast during said rotation of the mast about the pivot axis.

15. The method according to claim 14, further comprising rotating the at least one flipper arm in a deployment direction to control an angular rate of rotation of the mast as the mast pivots toward the deployed position.

16. The method according to claim 15, further comprising using a bump-stop to limit a maximum angular rotation of the mast about the pivot axis when the mast has reached a fully deployed position.

17. The method according to claim 16, further comprising arranging the bump stop so that the mast-head is disposed at a maximum distance from the UGV body when the mast is engaged by the bump stop.

18. The method according to claim 16, further comprising continuing rotation of the at least one flipper arm in the deployment direction after the mast is in the fully deployed position to position the at least one flipper arm to extend away from the UGV body for engaging a terrain.

19. The method according to claim 11, further comprising maintaining a fixed orientation of the mast head relative to the UGV body as the mast is rotated from its stowed position to its deployed position by using a multi-link mast structure.

* * * * *